(12) United States Patent
May

(10) Patent No.: US 10,594,708 B2
(45) Date of Patent: Mar. 17, 2020

(54) PROVIDING SECURITY IN A COMMUNICATION NETWORK

(71) Applicant: Fortinet, Inc., Sunnyvale, CA (US)

(72) Inventor: Robert A. May, North Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/951,831

(22) Filed: Apr. 12, 2018

(65) Prior Publication Data
US 2018/0234440 A1    Aug. 16, 2018

Related U.S. Application Data

(63) Continuation of application No. 14/815,458, filed on Jul. 31, 2015, now Pat. No. 9,948,662.

(51) Int. Cl.
*H04L 29/06* (2006.01)

(52) U.S. Cl.
CPC ...... *H04L 63/1416* (2013.01); *H04L 63/1408* (2013.01); *H04L 63/1433* (2013.01); *H04L 63/20* (2013.01)

(58) Field of Classification Search
CPC .................................................. H04L 63/1416
USPC .............................................................. 726/23
See application file for complete search history.

(56) References Cited

U.S. PATENT DOCUMENTS

| | | | |
|---|---|---|---|
| 5,864,665 A | 1/1999 | Tran | |
| 6,055,637 A | 4/2000 | Hudson et al. | |
| 9,948,662 B2 | 4/2018 | May | |
| 2002/0150253 A1 | 10/2002 | Brezak et al. | |
| 2003/0212806 A1 | 11/2003 | Mowers et al. | |
| 2005/0144437 A1 | 6/2005 | Ransom et al. | |
| 2005/0273850 A1* | 12/2005 | Freund | H04L 63/0227 726/14 |
| 2011/0055892 A1* | 3/2011 | Wang | G06F 21/82 726/3 |
| 2015/0373050 A1 | 12/2015 | Dayan et al. | |
| 2017/0034190 A1 | 2/2017 | May | |

OTHER PUBLICATIONS

Non-Final Rejection for U.S. Appl. No. 14/815,458 dated Jun. 20, 2017.
Notice of Allowance for for U.S. Appl. No. 14/815,458 dated Jan. 10, 2018.

* cited by examiner

*Primary Examiner* — Jacob Lipman
(74) *Attorney, Agent, or Firm* — Jaffery Watson Mendonsa & Hamilton, LLP

(57) ABSTRACT

Systems and methods for optimizing system resources by selectively enabling various scanning functions of a network security device are provided. According to one embodiment, information specifying a set of reputable websites deemed to be trustworthy by one or more web filtering services is received by a network security device protecting a private network. One or more directives are received by the network security device from a network administrator via a GUI of the network security device identifying one or more security features that are to be disabled for the set of reputable websites. Network traffic is intercepted by the network security device from an external network. When it is determined by the network security device that the external network is among the set of reputable websites, the network security device foregoes application of the one or more identified security features to the network traffic.

20 Claims, 7 Drawing Sheets

```
┌─────────────────────────────────────────────────────────────┐
│  Receive an application protocol request directed to an     │  302
│                      external network                        │
└─────────────────────────────────────────────────────────────┘
                              │
                              ▼
┌─────────────────────────────────────────────────────────────┐
│ Determine whether a network parameter of the external       │  304
│       network is associated with a set of trusted networks  │
└─────────────────────────────────────────────────────────────┘
                              │
                              ▼
┌─────────────────────────────────────────────────────────────┐
│ Selectively disable application of a subset of security     │  306
│ features of a plurality of security features when a result  │
│              of said determining is affirmative              │
└─────────────────────────────────────────────────────────────┘
```

FIG. 6

PROVIDING SECURITY IN A COMMUNICATION NETWORK

CROSS-REFERENCE TO RELATED PATENTS

This application is a continuation of U.S. patent application Ser. No. 14/815,458, filed on Jul. 31, 2015, now U.S. Pat. No. 9,948,662, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015-2018, Fortinet, Inc.

BACKGROUND

Field

Embodiments of the present invention generally relate to communication networks and more particularly to methods and systems for providing security in a communication network by selectively enabling various features for scanning user traffic streams.

Description of the Related Art

A Uniform Resource Locator (URL) is a reference to a resource (e.g., a web page, a file, a database, etc.) that specifies the destination location of the resource on a computer network, such as the Internet. When accessed via an Internet-enabled device, the URL enables a user to reach the destination location based on the Internet Protocol (IP) address associated with the domain name portion of the URL. Examples of Internet-enabled devices include, but are not limited to, laptop computers, desktop computers, smartphones and tablet computers. The destination location specified by a URL may be trusted and may include various cloud services, for example, Microsoft Windows Update™ and Apple iTunes™. Accessing such cloud services is safe for the device. In contrast, the destination location may be malicious or corrupted and thus when accessed may harm the device through malware attacks and/or undesirable (bot-driven) behavior.

In conventional methods and systems, to protect devices from such attacks various security features are deployed while accessing any URL. These security features are deployed regardless of the URL being associated with a trusted or a malicious destination location. Examples of such security features include Secure Sockets Layer (SSL) deep inspection, Transport Layer Security (TLS) deep inspection, antivirus scanning, antispyware scanning, antimalware scanning, sandbox analysis, pop-up blocking, packet logging, detailed content logging and stateful packet inspection. Deploying these security features while accessing each URL consumes a considerable amount of system resources and as a result has an impact on the system performance.

SUMMARY

Systems and methods are described for optimizing system resources by selectively enabling various scanning functions relating to user traffic streams based on the level of trust associated with the destination. According to one embodiment, information specifying a set of reputable websites deemed to be trustworthy by one or more web filtering services is received by a network security device protecting a private network. One or more directives are received by the network security device from a network administrator of the private network via a graphical user interface (GUI) of the network security device identifying one or more security features of multiple security features implemented by the network security device that are to be disabled for the set of reputable web sites. Network traffic is intercepted by the network security device from an external network responsive to an application protocol request originated by a client device associated with the private network. When it is determined by the network security device that the external network is among the set of reputable web sites, the network security device foregoes application of the one or more identified security features to the network traffic.

Other features of embodiments of the present disclosure will be apparent from accompanying drawings and from detailed description that follows.

BRIEF DESCRIPTION OF THE DRAWINGS

Systems and methods are described for optimizing system resources by selectively enabling various scanning functions relating to user traffic streams based on the level of trust associated with the destination. In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 6 illustrates a Graphical User Interface (GUI) for establishing security in an enterprise network, in accordance with an embodiment of the present invention.

DETAILED DESCRIPTION

Figure 1:
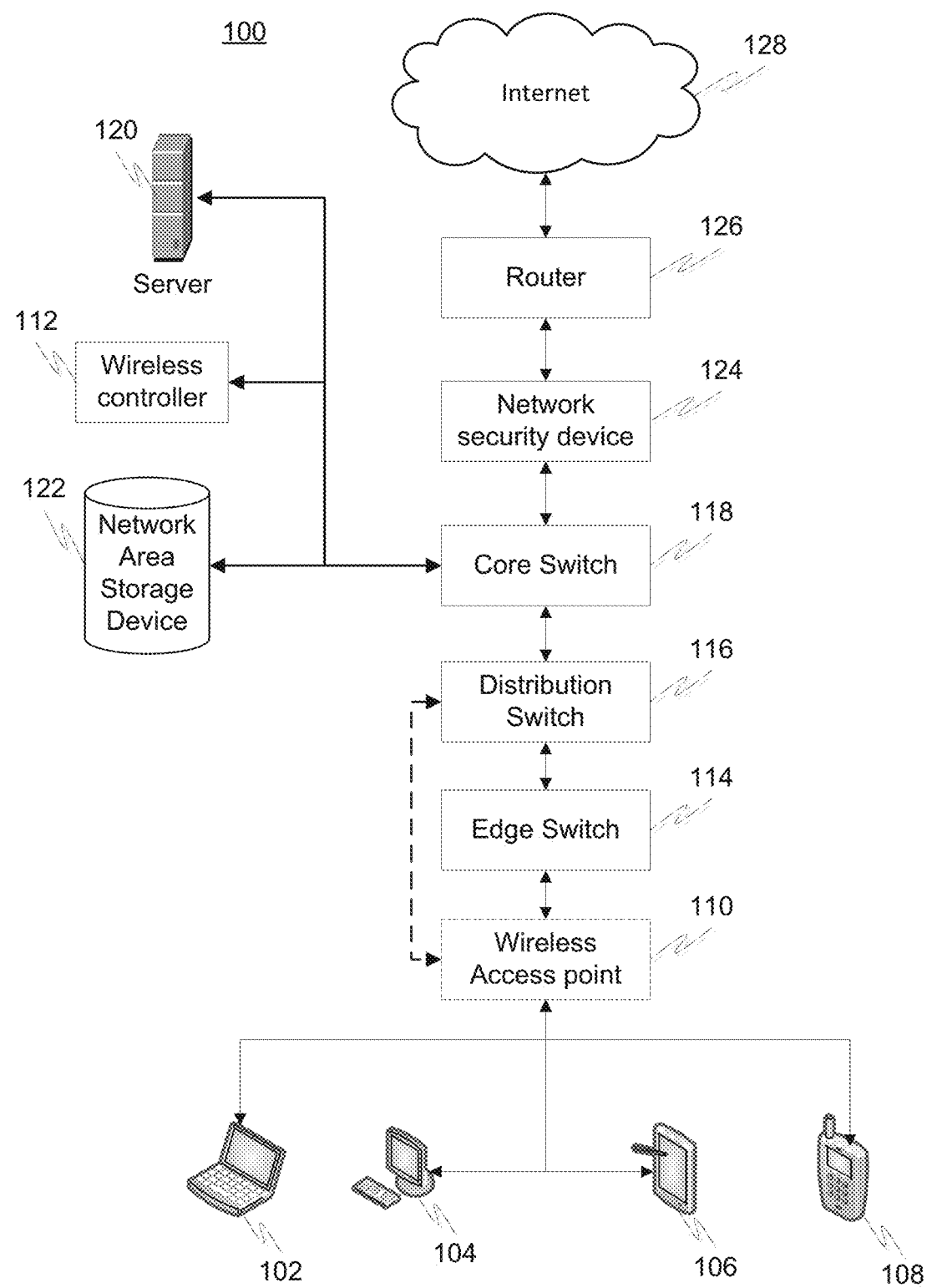
FIG. 1 illustrates an exemplary enterprise network in which various embodiments of the present invention may function.

Systems and methods are described for optimizing system resources by selectively enabling various scanning functions relating to user traffic streams based on the level of trust associated with the destination. Embodiments of the present disclosure generally relate to systems and methods for providing security in a communication network.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Terminology

Brief definitions of terms used throughout this application are given below.

If the specification states a component or feature "may", "can", "could", or "might" be included or have a characteristic, that particular component or feature is not required to be included or have the characteristic.

The phrase "network security device" generally refers to a hardware device or network appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. Load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), Internet Protocol (IP) security (IPSec), Secure Sockets Layer (SSL), antivirus, intrusion detection, intrusion prevention, Web content filtering, spyware prevention and anti-spam. Examples of network appliances include, but are not limited to, network gateways and network security devices (e.g., FORTIGATE family of network security devices and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

Referring to FIG. 1, an exemplary enterprise network 100 in which various embodiments of the present invention may function is illustrated. Enterprise network 100 includes multiple client devices (for example, a client device 102, a client device 104, a client device 106, and a client device 108). Client devices 102, 104, 106 and 108 may include, but are not limited to, personal computer(s), server(s), fax machines, printers, scanners, various mobile devices, such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. When one or more of client devices 102, 104, 106 and 108 are using wireless means to communicate within enterprise network 100, they may communicate with a wireless access point 110. The wired and wireless communication protocols/methods used by the client devices may include, but are not limited to direct connect, Ethernet (e.g., twisted pair 10/100/1000 Base T), transmission control protocol/internet protocol (TCP/IP), token ring, IEEE 802.11a/b/g/n/x, serial bus, universal serial bus (USB), infrared, PS/2, BNC, coaxial, component, composite, digital visual interface (DVI), high-definition multimedia interface (HDMI), RF antennas, S-Video, VGA, Bluetooth, cellular (e.g., code-division multiple access (CDMA), high-speed packet access (HSPA+), global system for mobile communications (GSM), long-term evolution (LTE), WiMax, or the like), etc.

Wireless access point 110 includes built-in radios that provide wireless signals to connect client devices that have wireless capability with enterprise network 100. It will be apparent to a person skilled in the art that enterprise network 100 may include multiple wireless access points. Wireless access point 110 collects wireless signals from wireless client devices and converts these signals into wired signals, which are then interpreted by a wireless controller 112. Wireless controller 112 provides functionalities that includes one or more of, but is not limited to, encryption, radio frequency management, failover, load balancing, centralized authentication, and wireless intrusion scanning within enterprise network 100.

After receiving communication from the client devices, wireless access point 110 communicates either with an edge switch 114 or with a distributed switch 116. It will be apparent to a person skilled in the art that enterprise network 100 may include multiple edge switches and multiple distributed switches. Edge switch 114 is a layer-2 switch that provides direct connectivity to the client devices and to wireless access point 110 within enterprise network 100, using, for example, copper Unshielded Twisted Pair (UTP) cables. Edge switch 114 further communicates with distributed switch 116 that may connect to both copper UTP cable network as well as optical fiber networks. Distribution switch 116, which provides an aggregation layer for network switching, further communicates with a core switch 118.

Core switch 118 is a layer-3 based network switch that communicates with distribution switch 116 and edge switch 114 directly or via distribution switch 116 using optical fiber network or UTP copper cabling. Core switch 118 further communicates with wireless controller 112 to facilitate communication between wireless controller 112 and wireless access point 110. Core switch 118 also communicates with a server 120 and a Network Area Storage (NAS) device 122. Server 120 may be one or more of an Enterprise Resource Planning (ERP) server, a web server, a mail server, a database server, and an application server. NAS device 122 may store data for server 120 and the client devices, in order to make such data accessible within enterprise network 100 as and when required.

Core switch 118 is in the center of enterprise network 100 and also connects with a router 126 through a network security device 124, which provides one or more of security features that include, but are not limited to firewall, anti-spam, anti-virus, content filtering, Uniform Resource Locator (URL) filtering, intrusion prevention, Virtual Private Network (VPN), and protection from Internet threats like Phishing. By enabling these security features, network security device 124 protects the client devices from any malicious attacks. Router 126 receives application protocol requests initiated from the client devices and gathers the content from the Internet 128 and other external networks by acting as a gateway between enterprise network 100 and the Internet 128.

Figure 2:
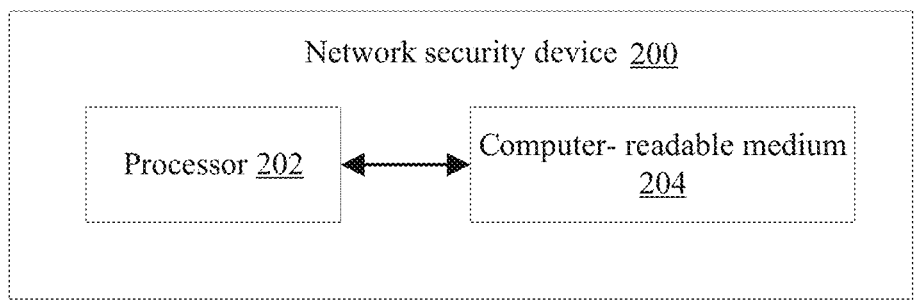
FIG. 2 is a block diagram illustrating a network security device in an enterprise network, in accordance with an embodiment of the present invention.

FIG. 2 illustrates a block diagram of a network security device 200 in an enterprise network, in accordance with an embodiment of the present invention. Network security device 200 may be based on one or more of a signature or behavior based Intrusion Detection System (IDS), a signature or behavior based Intrusion Prevention System (IPS), network based IDS (NIDS) or IPS (NIPS), Host based IDS (HIDS) or IPS (HIPS), a vulnerability scanner, a Honeypot, and a Honeynet. Network security device 200 includes one or more processors (for example, a processor 202) and a computer-readable medium 204. Examples of a computer-readable medium 204 have been provided above and are explained in further detail in conjunction with FIG. 7.

When a client device within the enterprise network initiates an application protocol request directed to an external network, network security device 200 receives that application protocol request before the client device is able to access that external network. An external network is a network that is outside the enterprise network and may include, for example, Microsoft Windows™ and Apple iTunes'. Network security device 200 has multiple built-in security features that may be used to protect the client device and other devices within the enterprise network from malware, malicious attacks, virus, and undesirable bot-driven behavior. Examples of a security feature may include, but are not limited to Secure Sockets Layer (SSL) deep inspection, Transport Layer Security (TLS) deep inspection, antivirus scan, antispyware scan, antimalware scan, sandbox analysis, pop-up blocker, packet logging, detailed content logging, stateful packet inspection, traffic shaping, Internet Content Adaptation Protocol (ICAP), Internet Content Adaptation Protocol (ICAP), Web Cache Communication Protocol (WCCP), routing online traffic to a preferred Wireless Access Network (WAN) link, and application level gateway.

Network security device 200 after receiving the application protocol request, determines whether a network parameter of the external network is associated with a set of trusted networks. Examples of network parameters may include but are not limited to a domain, a URL, a destination Internet Protocol (IP) address, a port number, a protocol, and a service. Protocols and associated port numbers, for example, may include but are not limited to File Transfer Protocol (FTP) associated with port number 20 and 21, Post Office Protocol (POP3) associated with port number 110, Internet Message Access Protocol (IMAP) associate with port number 143, Hypertext Transfer Protocol (HTTP) associated with port number 80, HTTP Secure (HTTPS) associated with port number 443, and Internet Relay Chat (IRC) associated with port number 194. Thus, based on one of these parameters or combination of these parameters, network security device 200 is able to determine whether the application protocol request is for a trusted or reputable network.

The set of trusted networks may have already been identified and information associated with these trusted networks may have been stored in a database within network security device 200. Alternatively, this database may be stored elsewhere within the enterprise network or outside the enterprise network and may be accessed by network security device 200 upon receiving the application protocol request. In an embodiment, in order to determine whether the external network is a trusted network, network security device 200 may query a trusted network parameters database (not shown), which may include a list of trusted network parameters associated with the set of trusted networks. The trusted network parameters database, for example, may include multiple fields corresponding to each trusted network, such that each field includes a particular type of network parameter, e.g., port number, domain, URL, or protocol.

Continuing with the present example, when network security device 200 receives a domain or a specific URL within the domain, as part of an application protocol request, network security device 200 may search the domain field or the URL field in the trusted network parameters database to find a match. Similarly, the field for IP address in the trusted network parameters database may be searched, when the application protocol request received by network security device 200 is for an IP address.

In response to determining whether a network parameter of the external network is associated with a trusted network, network security device 200 may arrive at a negative determination. In other words, the network parameter of the external network may not match with that of any trusted network. In this case, before the client device is able to access the external network, network security device 200 enables application of all security features in relation to client request. In a contrary scenario, in response to determining whether a network parameter of the external network is associated with a trusted network or not, network security device 200 may arrive at an affirmative determination. In other words, network parameter of the external network may match with that of a trusted network. In this case, when the client device accesses the external network, network security device 200 selectively disables application of a subset of the available security features. The subset of security features are selected based on a trust level associated with the external network. The association of a trust level with an external network is explained in further detail below with reference to FIG. 4.

Enabling all security features for every external network accessed by client devices within an enterprise network has an adverse impact on system performance. Thus, when a trusted network is being accessed, selectively disabling some of the security features optimizes the utilization of system resources in order to gain higher performance.

Figure 3:
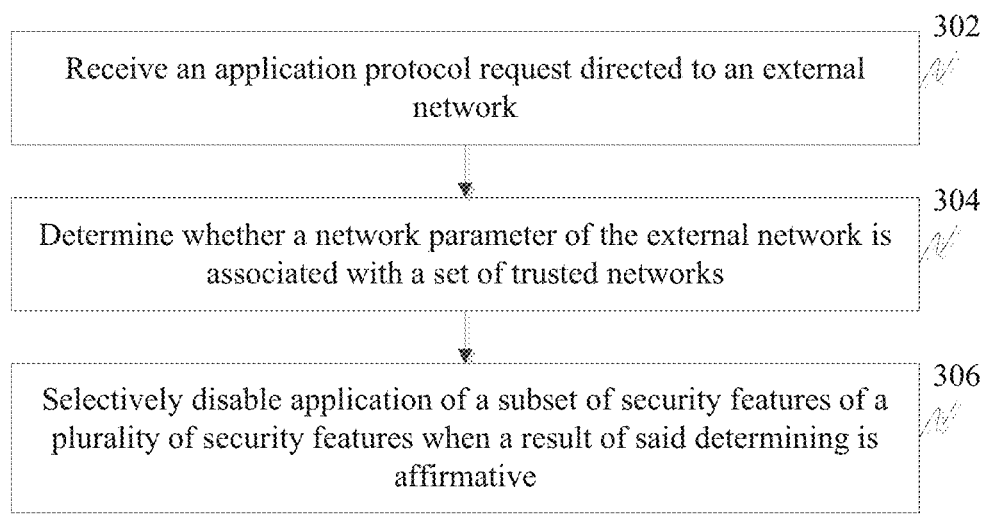
FIG. 3 illustrates a flowchart for providing security in an enterprise network, in accordance with an embodiment of the present invention.

Referring now to FIG. 3, a flowchart for providing security in an enterprise network is illustrated, in accordance with an embodiment of the present invention. A client device within the enterprise network generates an application protocol request to access an external network. Before the client device is able to access the external network, at step 302, network security device (e.g., network security device 124 or 200) receives the application protocol request. The application protocol request may include one or more of the following network parameters: a domain, a URL, a destination Internet Protocol (IP) address, a port number, a protocol, and a service.

Thereafter, at step 304, based on the application protocol request, the network security device determines whether a network parameter of the external network is associated with a set of trusted networks. To this end, the network security device may query a trusted network parameters database that includes a list of trusted network parameters associated with the set of trusted networks. An example of processing taking place within the determining step is explained in further detail below with reference to FIG. 4.

When client device accesses the external network and a result of the trust determination made by the network security device is affirmative, then at step 306, the network security device selectively disables application of a predefined and/or configurable subset of security features of those available on the network security device. In other words, only few of the security features may be enabled while accessing a trusted external network. Alternatively, if the result of the trust determination made by the network security device is negative, then the network security device may enable all available security features for application to the requested access to a non-trusted external network.

Figure 4:
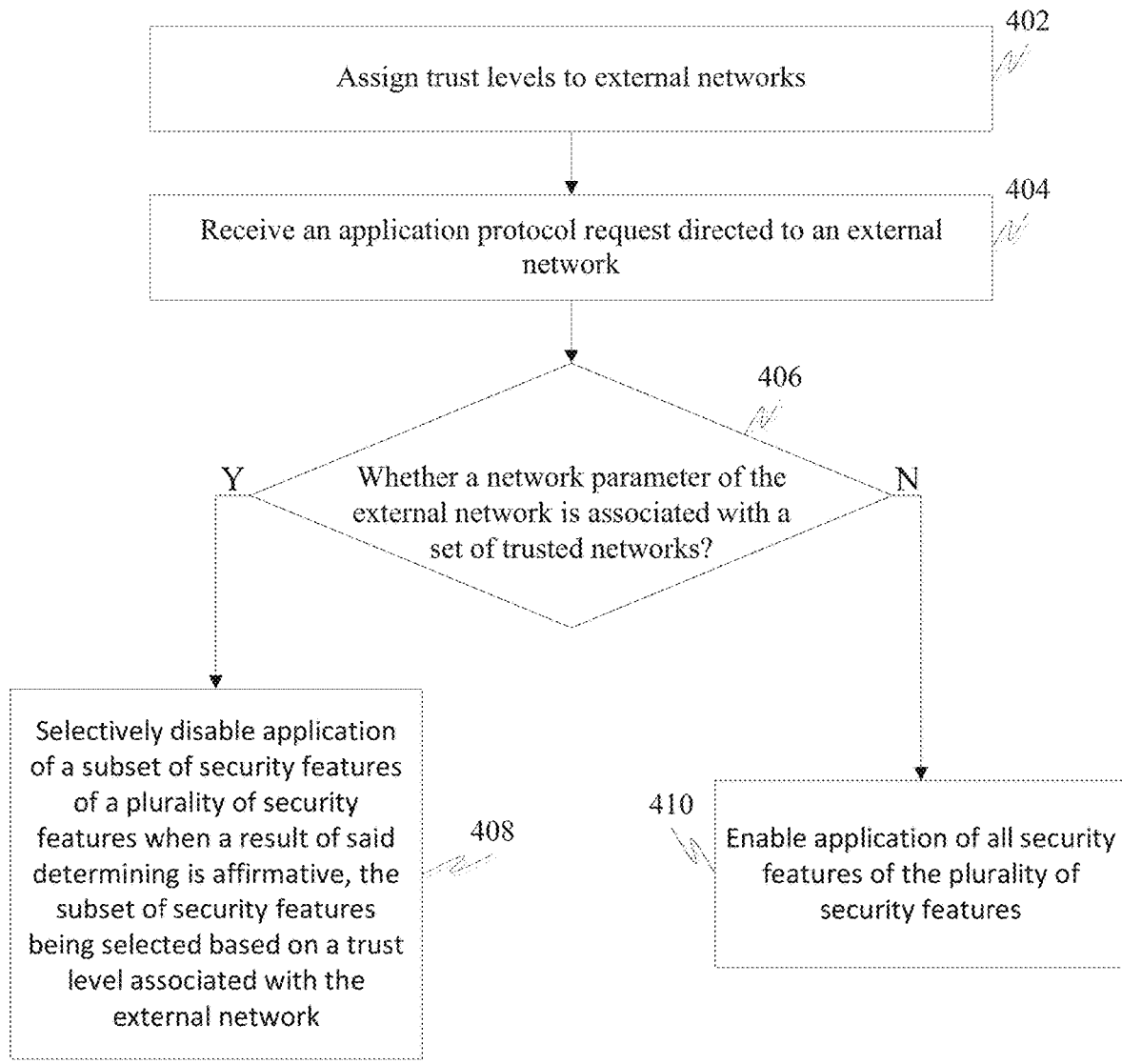
FIG. 4 illustrates a flowchart for providing security in an enterprise network, in accordance with another embodiment of the present invention.

Referring now to FIG. 4, a flowchart for providing security in an enterprise network is illustrated, in accordance with another embodiment of the present invention. At step 402, trust levels are assigned to various external networks. These trust levels may be assigned manually by a network administrator based on historical data available for these external networks regarding malicious attacks associated with these networks. Alternatively, some of the external networks may belong to large and credible corporate entities and thus may be considered safe to access by common sense. Such networks by default may be assigned higher trust levels. These trust levels may also be automatically assigned using data available from the Internet or from trusted third-party security vendors regarding these external networks. The data for example, may include the number of times an external network has been accessed by online users, the number of times an external network has been flagged as a security threat, and the number of users who have blocked an external network.

A trust level to be assigned to an external network is selected from multiple trust levels, such that, a higher trust level corresponds to disabling a greater number of security features and a lower trust level corresponds to disabling a lesser number of security features. For example, there may be five trust levels, i.e., trust level one to five, such that trust level five is assigned to those external networks that are most trusted and trust level one is assigned to those of the external networks that are the least trusted. Additionally, in this example, the network security device may have five corresponding built-in security features that may be selectively enabled or disabled based on the trust level associated with an external network being accessed. If an external network is assigned a trust level of five, then all five security features may be disabled when the client is accessing that external network. In contrast, if an external network is assigned a trust level of one, then all five security features may be enabled when the client device accesses that external network. In another scenario, if trust level other than one and five is assigned to an external network, then the number of security features that would be disabled would be between one and five. Those skilled in the art will appreciate, there need not be a one-to-one correspondence between the number of security features applied to a particular external network access and the trust level of the particular external network access. Furthermore, the number of security features disabled as the trust level increases (or enabled as the trust level decreases) need not be linear.

At step 404, the network security device receives an application protocol request that is directed to an external network, from a client device. Before the client device is able to access the external network, this request is intercepted and routed through the network security device, so as to protect the client device from potential malware or virus attack from the external network. At step 406, the network security device performs a check to determine whether a network parameter associated with the external network is associated with a set of trusted networks.

If the result of the check performed is affirmative, at step 408, the network security device may disable application of a subset of security features when the client device is accessing the external network. The number and/or type of security features that are disabled depends on the trust level assigned to the external network that is being accessed. In other words, when a network parameter of the external parameter is same as one of the trusted networks, then the network security device disables a certain number and/or type of security features based on the trust level assigned to the matching trusted network. For example, the network security device may find a match in the trusted network parameters for a destination IP address associated with the client request. After finding a match, the network security device may determine, for example, that the external network that corresponds to the destination IP address is Apple iTunes', which has been assigned a trust level of five. As a result, in the context of the simplified example used herein, when the client device accesses this destination IP address, application of all security features in the network security device may be disabled.

Referring back to step 406, if the result of the check performed is negative, at step 410 the network security device may enable application of all security features when the client device is accessing the external network. In other words, when a network parameter of the external network does not match with that of any trusted network, in the context of the simplified example used herein, the network security device enables all security features when the client device is accessing that external network. In this case, as no match is found in the trusted network parameters database, the network security device assumes that no trust level is assigned to the external network, as a result, the network security device enables all security features when the client device is accessing that external network.

Figure 5:
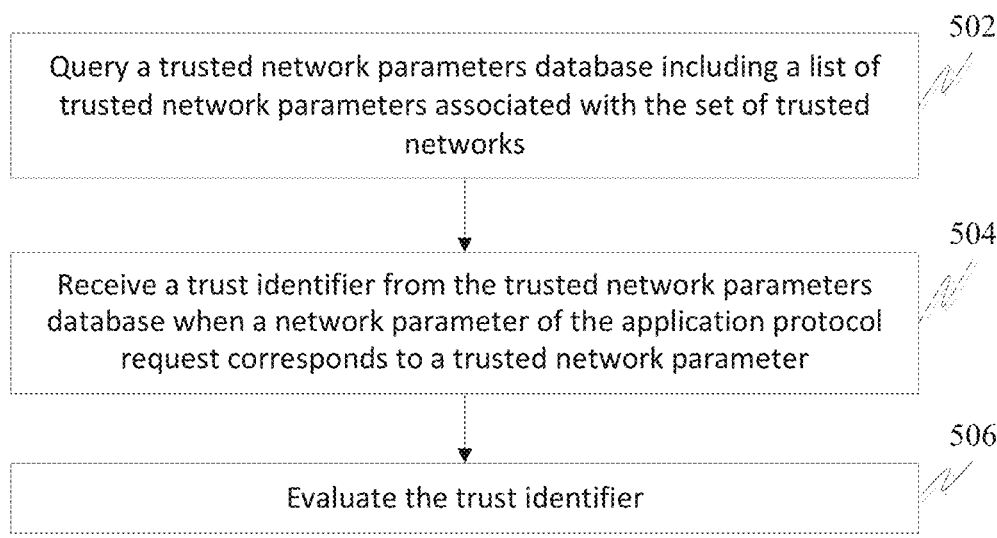
FIG. 5 illustrates a flowchart for determining whether a network parameter of the external network is associated with a set of trusted networks, in accordance with an embodiment of the present invention.

Referring now to FIG. 5, a flowchart for determining whether a network parameter of the external network is associated with a set of trusted networks is illustrated, in accordance with an embodiment of the present invention. After the network security device receives the application protocol request from a client device, the network security device determines whether a network parameter of the external network is associated with a set of trusted networks. To this end, at step 502, the network security device queries a trusted network parameters database that includes network parameter information for a set of trusted networks. The trusted network parameters database may include a list of trusted networks and different parameters associated with these trusted networks. These parameters for example, may include but are not limited to, a domain, a URL, a destination IP address, a port number, a protocol, and a service. For example, the database may include five trusted networks. In this case, for each of these five trusted networks, the database will include an associated domain, specific URLs within the domain, a destination IP address, one or more port numbers, and one or more protocols. Each trusted network may correspond to a single entry in the database or multiple entries, representing, for example, various possible combinations of the network parameters associated with the trusted network. Thus, when the network security device receives a domain request, it will compare the domain with domains associated with the list of trusted networks stored in the database. Similarly, when the network security device receives request for a specific URL within a domain, it will compare that URL with URLs associated with the trusted networks. When the comparison results in a match, the network security device may conclude that the external network is one of the trusted networks. Depending upon the particular implementation, a match between network parameters associated with the client request and the network parameters associated with the trusted networks may require a match between at least a predefined and/or configurable threshold number of corresponding parameters.

Continuing with the present example, when the network parameter(s) of the external network are considered a match with that/those of a trusted network, then at step 504, network security device 200 receives a trust identifier from the trusted network parameters database. In an embodiment, when the application protocol request includes a domain name or a specific URL within the domain of an external network and the domain name is that of a trusted network, the network security device receives a trust identifier from the trusted network parameters database. In another embodiment, the client device may store domain names and specific URLs in the domain for trusted networks, such that these domain names and specific URLs are appended with a trust identifier when stored. The trust identifier, for example, may be a flag tagged to the domain or the specific URLs in the domain for a trusted network. In this embodiment, whenever that domain of a trusted network or specific URLs in that domain are accessed from the client device, the network security device would detect presence of a flag and thereby selectively enable or disable applicable security features as appropriate for the corresponding trust level. The network security device in this case may not have to query the trusted network parameters database to check whether the domain or the specific URLs matches with that of a trusted network. As a result, utilization of system resources may be further optimized.

At step 506, the trust identifier is evaluated by the network security device in order to determine the trust level associated with the external network being accessed by the client device. Based on the evaluation, the network security device determines the number and/or type of security features that need to be enabled or disabled while the client device is accessing the external network as described above with reference to FIG. 4, for example.

Figure 6:
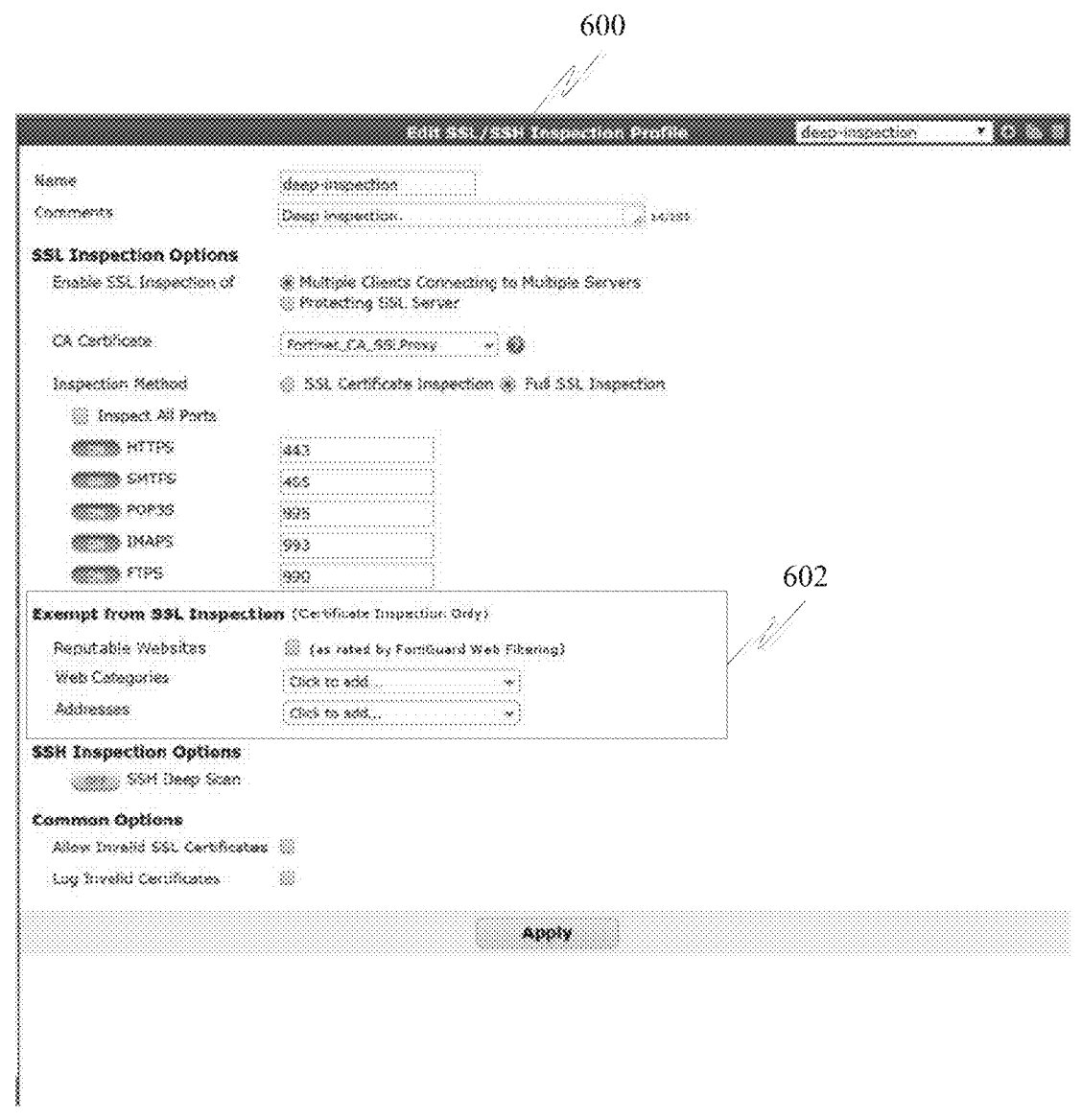

Referring now to FIG. 6, a Graphical User Interface (GUI) 600 for establishing security in an enterprise network is illustrated, in accordance with an exemplary embodiment of the present invention. GUI 600 includes an SSL field 602 to selectively disable or enable SSL inspection for trusted networks. It will be apparent to a person skilled in the art that GUI 600 may also include additional fields for enabling or disabling other security features for trusted networks. Other security feature, for example, may include TLS deep inspection, antivirus scan, antispyware scan, antimalware scan, sandbox analysis, pop-up blocker, packet logging, detailed content logging, stateful packet inspection, traffic shaping, ICAP, WCCP, routing online traffic to a preferred WAN link, and application level gateway.

SSL field 602 may have multiple sub fields that may be used to add URLs for which SSL inspection should be disabled or enabled. A network administrator or other authorized user may directly enter domains or URLs into these sub fields of SSL field 602. Alternatively, a drop down menu may be associated with one or more of these sub fields, such that, the drop down menu picks domains or URLs from the favorite list saved in the Internet browser on the client device. Thus, the administrator or user may easily be able to add a frequently accessed domain or URL into the SSL exemption list. In addition to entering domains and specific URLs in a domain, the administrator or user may also be able to add other network parameters to the SSL exemption list using SSL field 602. In an embodiment, GUI 600 may include a trust field (not shown in FIG. 6) in which the administrator or user may be able to assign different trust levels to external networks based on their own discretion. Alternatively, trust may be based on assessment by one or more third party web filtering services. In some embodiments, multiple user profiles may be created that have customized trust levels assigned to the same set of external networks. Thus, in this case, the automatic assignment of trust levels to external networks may be overridden by a particular user in order to suit his/her requirements. It will be apparent to a personal skilled in the art that GUI 600 may include fields similar to SSL field 602 for each of the security features available within the network security device. As a result, depending upon the particular implementation, users may be provided with the ability to selectively enable or disable one or more of these security features based on their own discretion. In an embodiment, user profiles may be created for multiple users accessing the client device. Each user may selectively enable and disable application of different security features for the same set of networks and may accordingly create a corresponding user profile. Thus, whenever a user logs on to the client device, the rules set for enabling and disabling security features by that user would be automatically activated.

Figure 7:
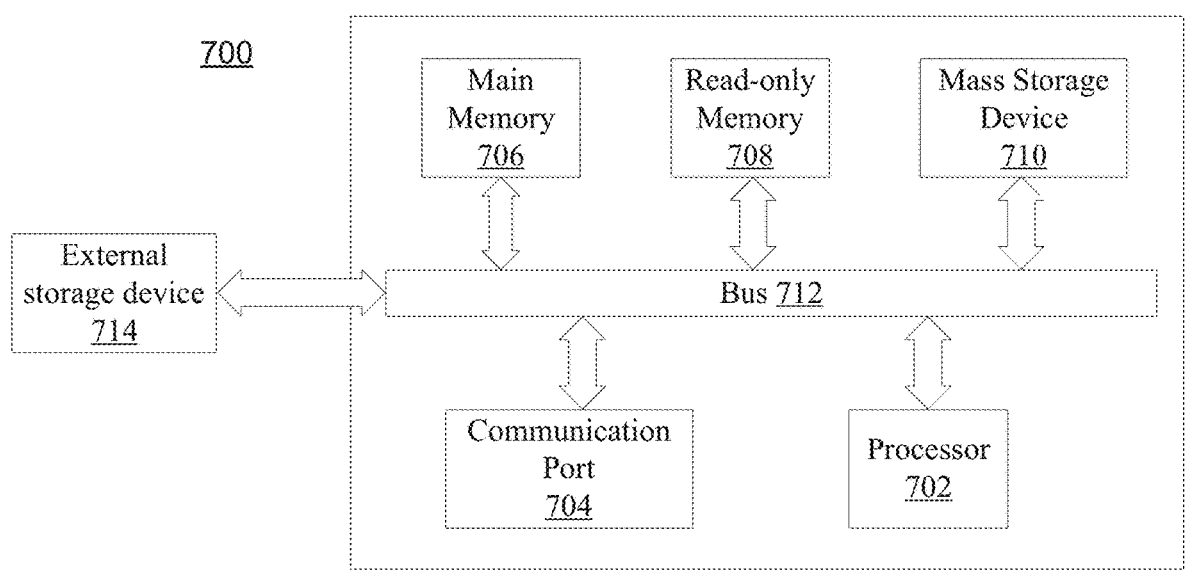
FIG. 7 illustrates an exemplary computer system in which or with which embodiments of the present invention may be utilized.

FIG. 7 is an example of a computer system 700 with which embodiments of the present disclosure may be utilized. Computer system 700 may represent or form a part of a network security device (e.g., network security device 124 or 200).

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

Various embodiments of the present invention provide methods and devices for establishing security in an enterprise network, such that, optimal utilization of system resources is ensured by selectively enabling or disabling various scanning functions relating to user traffic streams based on the level of trust associated with the destination. Enabling all security features for every external network accessed by client devices within an enterprise network has an adverse impact on system performance. Thus, selectively disabling some of the security features for trusted networks optimizes utilization of the system resources in order to gain higher system performance. In an embodiment, the client device may store domains or specific URLs in the domains for trusted networks such that these domains or URLs are appended with a trust identifier when stored. In this case, the network security device does not need to query the trusted network parameters database to check for a match with a trusted network. As a result, utilization of system resources is further optimized. In another embodiment, users may also be able to create multiple user profiles in a client device, such that, each user profile has its own set of rules for enabling and disabling security features while accessing external networks. Thus, users are able to customize application of security feature based on their discretion.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A method comprising:
receiving, by a network security device protecting a private network, information specifying a set of reputable websites deemed to be trustworthy from one or more web filtering services;
receiving, by the network security device, one or more directives from a network administrator of the private network via a graphical user interface (GUI) of the network security device identifying one or more security features of a plurality of security features implemented by the network security device that are to be disabled for the set of reputable websites;
intercepting, by the network security device, network traffic from an external network responsive to an application protocol request originated by a client device associated with the private network;
determining, by the network security device, whether the external network is among the set of reputable websites; and
when said determining is affirmative, foregoing application, by the network security device, of the one or more identified security features to the network traffic.

2. The method of claim 1, wherein the one or more identified security features comprises sandbox analysis.

3. The method of claim 1, wherein the one or more identified security features comprises antivirus scanning.

4. The method of claim 1, wherein the one or more identified security features comprises Secure Sockets Layer (SSL) deep inspection.

5. The method of claim 1, further comprising allowing the network administrator to supplement the set of reputable websites by specifying one or more categories of websites or Internet Protocol (IP) addresses via the GUI.

6. The method of claim 1, wherein the network security device comprises a unified threat management (UTM) appliance.

7. The method of claim 1, wherein the one or more identified security features comprises sandbox analysis.

8. The method of claim 1, wherein the one or more identified security features comprises antivirus scanning.

9. The method of claim 1, wherein the one or more identified security features comprises Secure Sockets Layer (SSL) deep inspection.

10. The method of claim 1, further comprising when said determining is negative, applying, by the network security device, the plurality of security features to the network traffic.

11. The method of claim 1, further comprising allowing the network administrator to supplement the set of reputable websites by specifying one or more categories of websites or Internet Protocol (IP) addresses via the GUI.

12. The method of claim 1, wherein the network security device comprises a unified threat management (UTM) appliance.

13. The method of claim 1, further comprising when said determining is negative, applying, by the network security device, the plurality of security features to the network traffic.

14. The method of claim 13, wherein the one or more identified security features comprises sandbox analysis.

15. The method of claim 13, wherein the one or more identified security features comprises antivirus scanning.

16. The method of claim 13, wherein the one or more identified security features comprises Secure Sockets Layer (SSL) deep inspection.

17. The method of claim 13, wherein the one or more identified security features comprises sandbox analysis.

18. The method of claim 13, wherein the one or more identified security features comprises antivirus scanning.

19. The method of claim 13, wherein the one or more identified security features comprises Secure Sockets Layer (SSL) deep inspection.

20. A network security device protecting a private network comprising:
at least one processor; and
a computer-readable medium storing instructions that, when executed by the at least one processor, cause the at least one processor to perform a method comprising:
receiving information specifying a set of reputable websites deemed to be trustworthy from one or more web filtering services;
receiving one or more directives from a network administrator of the private network via a graphical user interface (GUI) of the network security device identifying one or more security features of a plurality of security features implemented by the network security device that are to be disabled for the set of reputable websites;
intercepting network traffic from an external network responsive to an application protocol request originated by a client device associated with the private network;
determining whether the external network is among the set of reputable web sites; and
when said determining is affirmative, foregoing application of the one or more identified security features to the network traffic.

* * * * *